June 28, 1955 W. B. RICHARDSON 2,711,808
FLUID OPERATED CLUTCH
Filed Oct. 29, 1952 2 Sheets-Sheet 1
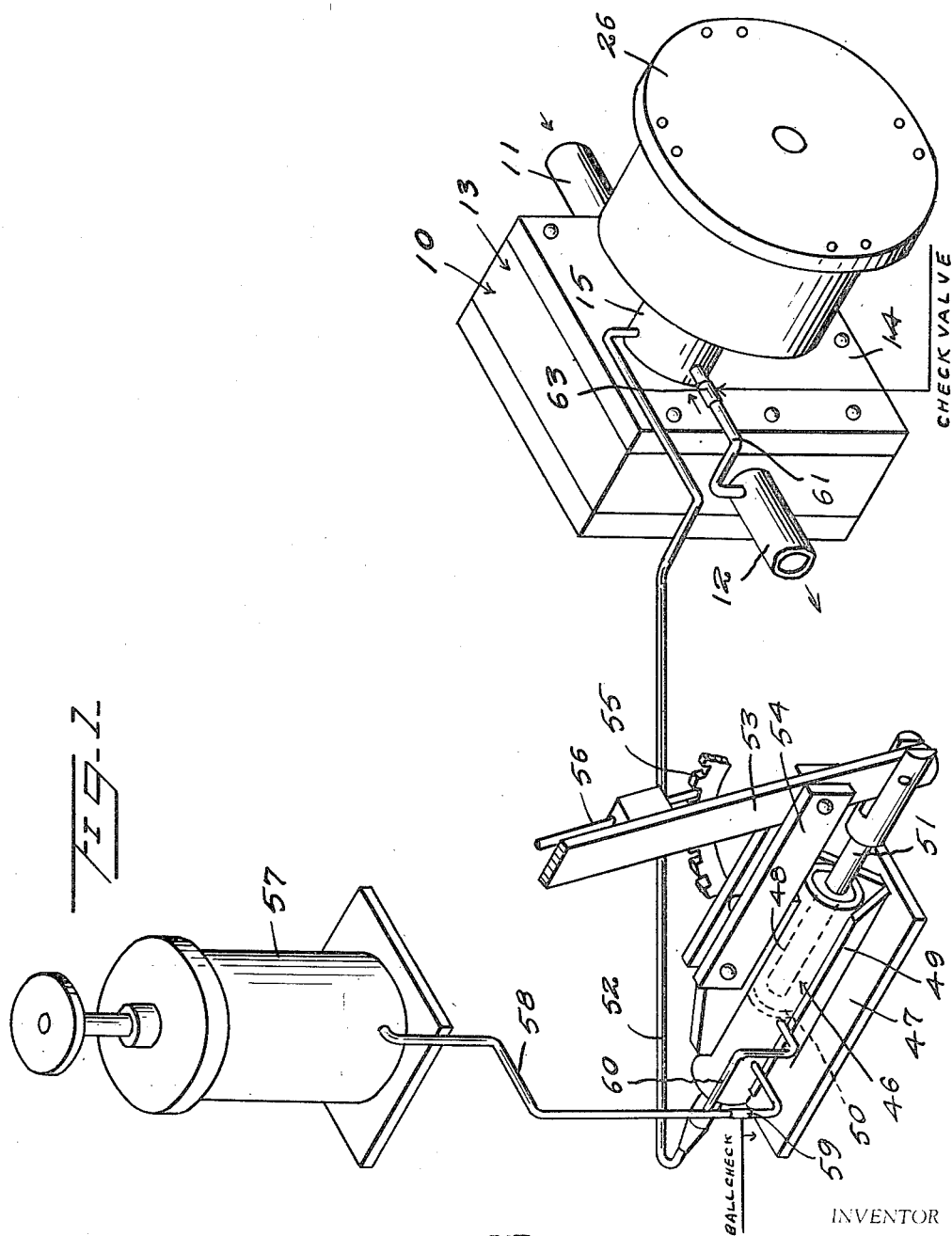
INVENTOR
Walter B. Richardson
BY Kimmel & Crowell
ATTORNEYS

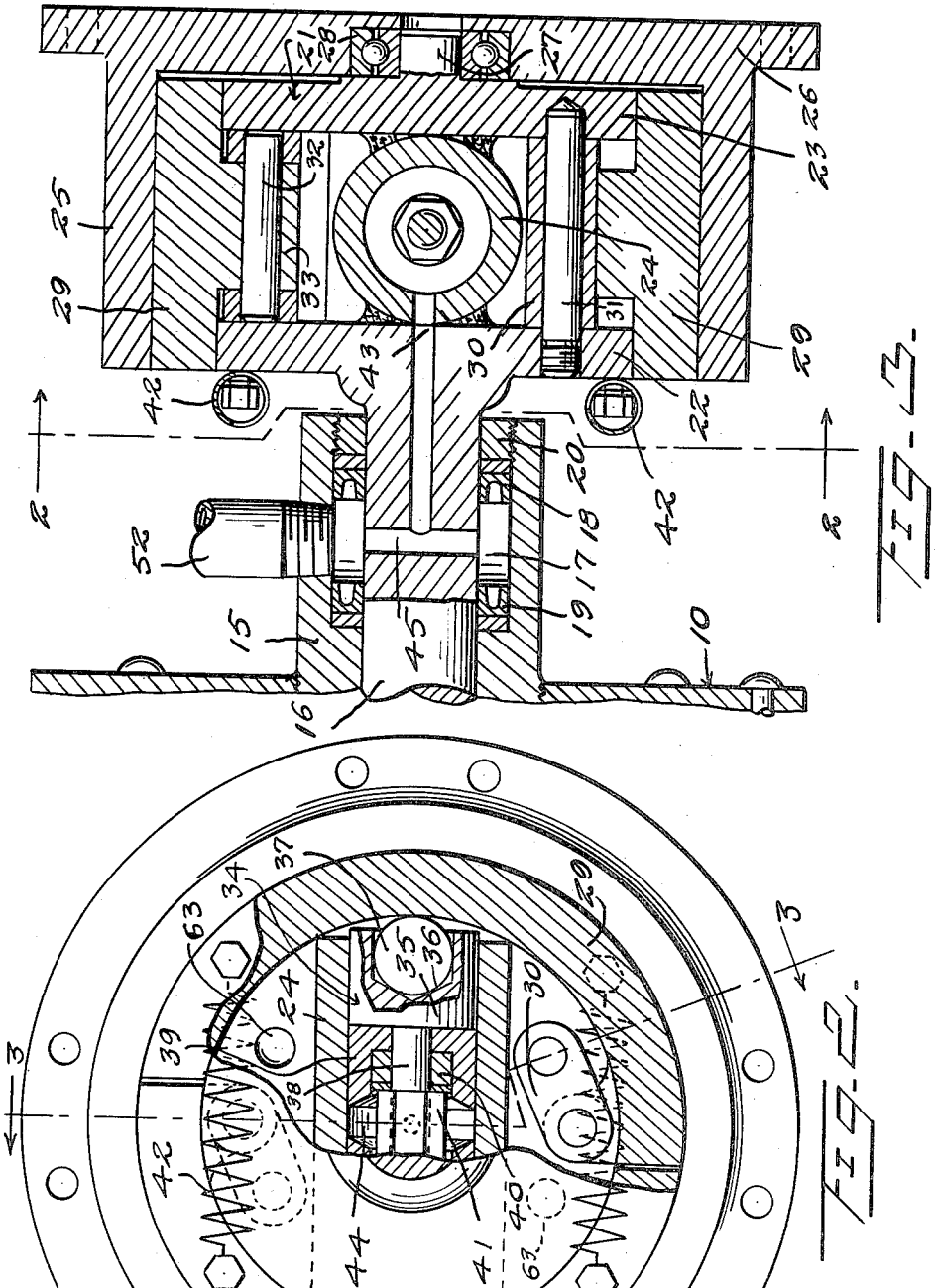

United States Patent Office 2,711,808
Patented June 28, 1955

2,711,808

FLUID OPERATED CLUTCH

Walter B. Richardson, Bridgton, Maine

Application October 29, 1952, Serial No. 317,436

2 Claims. (Cl. 192—85)

This invention relates to a fluid operated clutch.

An object of this invention is to provide in combination with a pump and a driving means therefor, a fluid operated clutch which is initially set by manual control, and the clutch is then maintained in operative or clutching position by pressure from the pump.

Another object of this invention is to provide an improved fluid clutch which may be operated either clockwise or counterclockwise.

A further object of this invention is to provide a fluid clutch which is formed as part of a coupling for connection with a driving means.

With the above and other objects in view, my invention consists in the arrangement, combination and details of construction disclosed in the drawings and specification, and then more particularly pointed out in the appended claims.

In the drawings—

Figure 1 is a perspective view of a combined pump and fluid clutch system constructed according to an embodiment of this invention, Figure 2 is a sectional view taken on the line 2—2 of Figure 3, Figure 3 is a fragmentary sectional view taken on the line 3—3 of Figure 2.

Referring to the drawings, the numeral 10 designates generally a rotary pump of conventional construction, having a suction pipe 11 connected to one side thereof, and a pressure or outlet pipe 12 connected to the pressure side thereof. The pump 10 includes a housing 13 formed with a plate 14, having a bushing 15 extending therefrom.

A shaft 16 rotatably extends through the bushing 15 and the latter is formed with an enlarged annular chamber 17. Confronting ring-shaped packing members 18 and 19 are disposed at the opposite ends of the chamber 17, and sealing member 18 bears against an annular nut 20 which engages about the shaft 16 and is threaded into the outer end of bushing 15.

Shaft 16 has fixed thereto a shoe carrier generally indicated at 21. The shoe carrier 21 is formed of an inner plate 22, an outer plate 23, and a pressure cylinder 24, which is fixed as by welding or the like between the two plates 22 and 23. A cylindrical drum 25 is disposed about the carrier 22 and has formed integral with the outer end thereof a coupling plate 26. It will be understood that the coupling plate 26 is only one form or example of connecting drum 25 to a power source, and that any suitable conventional means may be used for connecting drum 25 to a power source. Carrier plate 23 is formed with a central stud 27 which projects into the center of coupling plate 26, and anti-friction bearings 28 are disposed about the stud 27.

A pair of substantially semi-circular clutch shoes 29 are disposed within the drum 25, and the shoes 29 are rockably secured between the carrier plates 22 and 23 by means of a link 30 which is pivotally secured at one end thereof to a pivot pin 31 fixed between the two carrier plates 22 and 23. The link 30 is also pivotally secured as by a pivot pin 32 to an inwardly projecting ear 33 carried by one end of each clutch shoe 29. In case the drum 25 rotates in a reverse direction, the links 30 may be reversed by disposing pins 31 in openings 63 in plates 22 and 23.

The cylinder 24 has slidable therein a pair of pistons or plungers generally indicated at 34. Each piston or plunger 34 is formed of a body 35 having a recess or socket 36 in its outer end within which a ball or roller 37 is loosely mounted. The body 35 includes an inwardly projecting stud 38 on which a cup-shaped washer 39 is mounted, and washer 39 is secured on the stud 38 by means of a central washer 40 engaging interiorly of the cup-shaped member 39 and secured therein by means of a nut 41 which is threaded on the inner end of stud 38. The two sealing cups 39 of the two pistons or plungers 34 are disposed in spaced confronting position, as shown in Figure 2, so that liquid may enter therebetween and force the pistons outwardly to pressure applying position against the clutch shoes 29. The clutch shoes 29 are constantly urged inwardly to released position by means of a pair of springs 42, as shown in Figure 2.

Shaft 16 is formed with a longitudinal passage 43 communicating at one end with the interior of cylinder 24, and the space or chamber 44 disposed between the inner ends of the pistons or plungers 34. Shaft 16 is also provided with a transverse passage or opening 45 communicating with passage 43, and transverse passage 45 communicates with chamber 17.

In order to provide a means whereby fluid pressure may be initially formed in chamber 17 and chamber 44 so as to effect outward movement of the pistons 34 and thereby move clutch members 29 to clutching position with respect to drum 25, I have provided a manually operable pump or pressure member generally indicated at 46. Pump or pressure member 46 includes a base 47, a cylinder 48 mounted on a V-shaped cradle 49. A piston 50 is slidable in cylinder 48 and a piston rod 51 projects through one end of the cylinder 48.

A pipe 52 is connected with the opposite end of cylinder 48 and also connected with bushing 15. Rod 51 has pivotally secured thereto a lever 53 which is pivotally secured between a pair of bars 54 fixed to the top of cylinder 48.

Lever 53 is adapted to be locked in selected operative or inoperative position by means of a toothed rack 55 which is fixed relative to the bars 54 and with which spring-pressed latch member 56 engages. A supply reservoir 57 is disposed remote from the pressure member 46 and is connected thereto by means of a pipe 58. The pipe 58 has interposed therein a ball check valve 59 opening in the direction of the pressure member 48.

A return pipe 60 is connected at one end to the cylinder 48 inwardly from the connection of pipe 58, with cylinder 48, and the opposite end of return pipe 60 is connected with pipe 58 outwardly from check valve 59.

In order to provide a means whereby pressure generated by operation of pump 13 may be communicated to the clutch hereinbefore described, I have provided a pipe 61 which is connected at one end to the pressure pipe 12 and is connected at the other end to bushing 15. A check valve 63 is interposed in pipe 61 and opens in the direction of bushing 15.

In the use and operation of this device, the coupling plate 26 is adapted to be secured to a driving element which may be continuously operating and in the normal or initial position clutch shoes 29 will be disposed in their released position with hand lever 53 disposed in the position shown in Figure 1.

In order to initially effect operation of pump 10 by rotation of coupling member 26, hand lever 53 is rocked clockwise as viewed in Figure 3, so as to move piston 50 inwardly or to the left and force liquid in cylinder 48 through pipe 52 into chamber 17 of bushing 15. The liquid under pressure in chamber 17 will also flow through passages 45 and 43 into chamber 44 of cylinder 24, thereby moving clutch shoe pistons or plungers 34 outwardly to effect binding action between clutch shoe 29 and drum or cylinder 25. When pump 10 is thus coupled by initial hand pressure to coupling member 26, rotation of pump 10 will force liquid under pressure through outlet 12 and pressure in outlet 12 will also be communicated to bushing 15 through bypass pipe 61. In this manner the pressure generated by pump 10 will maintain a coupling between the clutch means and the coupling member 26. The clutch means may be released by rocking lever 53 counter-clockwise or to the left, as viewed in Figure 1, so that piston 50 will uncover the end of return pipe 60.

The movement of the piston 34 in engaging and disengaging the clutch is of the order of thousandths of an inch, and thus there is only slight oil flow in the clutch hydraulic system. It is only necessary that the pressure in chamber 17 drop momentarily, in order to release the clutch and causee the pump to stop. With a ½-inch diameter piston 50, and a moderate length lever 53, a pressure of 2000 p. s. i. can easily be built up in the clutch cylinder. The pump is designed for operations requiring around 1000 to 1500 p. s. i. In this case, the check valve 63 will remain closed. When the lever is released, the pressure in chamber 17 will momentarily drop and release the clutch, even before piston 50 uncovers the entrance to pipe 60 in cylinder 46. It is not obvious that this will indeed happen, for it is conceivable that the pressure from pipe 61 would build up the pressure in chamber 17 before de-clutching could occur. However, the latter does not occur.

During the operation of the pump, overloads occasionally occur, momentarily raising the line pressure to several thousands of pounds per square inch. Then the check valve in pipe 61 opens, and allows pressure to build up in chamber 17, and increase the clutching force. This finally builds up such high pressure in the clutch system that merely releasing the lever will not reduce the chamber pressure enough to allow de-clutching. Thus the need for pipe 60. This allows the release of this excess pressure to reservoir 57, thereby permitting de-clutching.

I do not mean to confine myself to the exact details of construction herein disclosed, but claim all variations falling within the purview of the appended claims.

What I claim is:

1. In combination, a rotary pump, a coupling member, fluid operated clutch means connected between said pump and said member, a pipe connecting the pressure side of said pump with said clutch means, a rearwardly closing check valve interposed in said pipe, and manually operated pressure means connected with said clutch means for initially effecting actuation of said clutch means to clutching position and for releasing said clutch means while said pump is in operation, said means including a fluid reservoir, a second pump, a manually operated lever means for operating said second pump, a connection between said reservoir and said second pump, a ball check valve in said last mentioned connection, a return pipe from said pump to a point between said ball check valve and said reservoir, and a pipe extending from the discharge end of said second pump to said clutch.

2. In combination, a rotary pump, a driving member for said pump, fluid clutch means cooperating with said pump and said driving member, manually operated means connected with said clutch means for initially actuating the latter to clutching position, and means connected to said pump and said clutch means for holding the latter in clutching position while said pump is operating, said means including a fluid reservoir, a second pump, a manually operated lever means for operating said second pump, a connection between said reservoir and said second pump, a ball check valve in said last mentioned connection, a return pipe from said pump to a point between said ball check valve and said reservoir, and a pipe extending from the discharge end of said second pump to said clutch.

References Cited in the file of this patent

UNITED STATES PATENTS

| | | |
|---|---|---|
| 1,118,994 | Woolley | Dec. 1, 1914 |
| 2,328,091 | Nutt et al. | Aug. 31, 1943 |
| 2,506,842 | Rockwell | May 9, 1950 |
| 2,531,744 | Robbins | Nov. 28, 1950 |
| 2,562,515 | Wemp | July 31, 1951 |